US 6,719,819 B2

(12) United States Patent
Ota et al.

(10) Patent No.: US 6,719,819 B2
(45) Date of Patent: Apr. 13, 2004

(54) POLISHING COMPOSITION

(75) Inventors: Isao Ota, Funabashi (JP); Tohru Nishimura, Funabashi (JP); Gen Yamada, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/281,104

(22) Filed: Oct. 28, 2002

(65) Prior Publication Data

US 2003/0110711 A1 Jun. 19, 2003

Related U.S. Application Data

(63) Continuation-in-part of application No. PCT/JP01/03818, filed on May 7, 2001.

(30) Foreign Application Priority Data

May 12, 2000 (JP) ........................................ 2000-139671

(51) Int. Cl.[7] ............................. C09G 1/02; C09G 1/04
(52) U.S. Cl. ............................................. 51/308; 106/3
(58) Field of Search ............................... 51/308; 106/3; 438/692, 693; 216/102, 103

(56) References Cited

U.S. PATENT DOCUMENTS

| 4,588,421 | A | | 5/1986 | Payne | |
|---|---|---|---|---|---|
| 5,800,577 | A | * | 9/1998 | Kido | 51/307 |
| 6,007,592 | A | * | 12/1999 | Kasai et al. | 51/309 |
| 6,258,140 | B1 | * | 7/2001 | Shemo et al. | 51/308 |
| 6,340,374 | B1 | * | 1/2002 | Kato et al. | 51/308 |
| 6,454,820 | B2 | * | 9/2002 | Hagihara et al. | 51/308 |

FOREIGN PATENT DOCUMENTS

| EP | 1 041 129 A1 | 10/2000 |
|---|---|---|
| EP | 1 065 251 A1 | 1/2001 |
| JP | A 11-167714 | 6/1999 |
| JP | A 2000-345113 | 11/2000 |

* cited by examiner

*Primary Examiner*—Michael Marcheschi
(74) *Attorney, Agent, or Firm*—Oliff & Berridge, PLC

(57) ABSTRACT

For aluminum disks and glass-made hard disks, those disks having a mean waviness of less than 3 Å are being desired in order to increase the density of memory capacity. The present invention provides polishing compositions that can give smoothly polished surfaces for the disks. The polishing compositions are polishing compositions for aluminum disks or substrates having silica on the surface thereof, which contain colloidal silica particle groups having different particle size distributions and have a $SiO_2$ concentration of 0.5 to 50% by weight.

7 Claims, No Drawings

POLISHING COMPOSITION

This is a cont.-in-part of international application No. PCT/JP01/03818, filed on May 7, 2001.

BACKGROUND OF THE INVENTION

1. Field of the Art

The present invention relates to a polishing composition for aluminum disks having a $SiO_2$ concentration of 0.5 to 50% by weight containing colloidal silica particle groups having different monomodal numerical particle size distribution therein or substrates having silica on the surface thereof, in order to obtain a polished surface having a smaller mean waviness.

Here, the polishing of aluminum disks referred to herein means polishing the surface of the substrate itself of a magnetic memory disk composed of aluminum or its alloy, or polishing the surface of the nickel-phosphorus (Ni—P) or nickel-boron (Ni—B) plating, especially a hard layer of non-electrolysis nickel-phosphorus (Ni—P) plating composing of 90 to 92% of Ni and 8 to 10% of P, and aluminum oxide layer on the substrate.

Polishing of the substrate with silica on the surface thereof means polishing the surface layer on the substrate containing 50% or more by weight of silica. Examples of such polishing include polishing rock crystal, quartz glass for photomasks, silicon oxide films on semiconductor devices, crystallized glass-made hard disks, and either aluminosilicate glass- or soda lime glass-made hard disks.

Since the polishing composition of the present invention can efficiently give smooth polished surfaces with high precision, it is also useful for the precision polishing of semiconductor wafers made of silicon alone, semiconductors wafers made of chemical compounds such as gallium arsenide, gallium phosphide or indium phosphide, and interconnecting metals such as copper and aluminum for semiconductor multi level interconnection substrates, nitride films and carbide films and the like, as well as for final polishing of single crystals of sapphire, lithium tantalate, lithium niobate and the like, and GMR magnetic head among others.

2. Description of the Related Art

Sols composed of highly stable colloidal silica particles as the silica sol have been used in part or under consideration for use in the final polishing of aluminum disks, glass disks, quartz glass for photomasks, rock crystal, siliceous substrate such as silicon oxide films for semiconductor devices, semiconductor wafers, single crystals such as sapphire, lithium tantalate and lithium niobate, MR magnetic head and the like. However, it has been pointed out that silica sol has a shortcoming in low removal rate in spite of attaining highly satisfactory polished surface having a good mean surface roughness.

SUMMARY OF THE INVENTION

The object of the present invention is to provide a polishing composition for aluminum disks and glass-made disks, quartz glass, rock crystal as well as silicon oxide films for semiconductor devices in view of solving low removal rate and giving polished surface of excellent quality. In particular, the disk is likely to be rotated at an increased rotation speed with the decreased gap between the disk and the magnetic head in order to meet the increase in the density of memory capacity in the case of aluminum disks and glass-made hard disks, and furthermore, disks with less mean waviness are being desired in recent days.

In particular, more rigorous requirements for mean waviness are being asked for aluminum disks and glass-made hard disks in order to meet the increase in the density of memory capacity leading to faster rotation of the disk with the decreased gap between the disk and the magnetic head. Recently, disks having a mean waviness of less than 3 Å are being desired.

Here, the present invention was accomplished in making a polishing composition containing colloidal silica particles with a $SiO_2$ concentration of 0.5 to 50% by weight by the use of a water dispersed stable silica sol containing colloidal silica particle groups having two or three types of different monomodal numerical particle size distributions with the ratio of the mean particle size (particle size measured with the nitrogen adsorption method) being 0.15 to 0.80 mixed with $SiO_2$ with the weight ratio of 1:0.05 to 9.0, and in obtaining an aluminum disk or a substrate having silica on the surface thereof of good quality.

The measured particle size of colloidal silica particle group determined with the nitrogen adsorption method can be obtained according to the formula $D=2720/S$ (nm) from the specific surface area $S$ ($m^2/g$) measured with the nitrogen adsorption method.

More specifically, the first embodiment of the instant invention relates to a polishing composition for an aluminum disk comprising of a colloidal silica particle group having a monomodal numerical particle size distribution with primary particle sizes of 80 to 120 nm as observed on a transmission electron microscope being 90% or more of the total particle number, and having a mean particle size $D_a$ (particle size measured with the nitrogen adsorption method) in the range of 65 to 100 nm (referred as colloidal silica particle group (a) hereinafter), and a colloidal silica particle group having a monomodal numerical particle size distribution with primary particle sizes of 20 to 40 nm as observed on a transmission electron microscope being 90% or more of the total particle number, and having a mean particle size $D_c$ (particle size measured with the nitrogen adsorption method) in the range of 15 to 25 nm (referred as colloidal silica particle group (c) hereinafter), wherein said composition has the ratio of $D_c/D_a$ of 0.15 to 0.38, contains a water dispersed stable silica sol mixed as $SiO_2$ with the weight ratio of said colloidal silica particle group (a) to said colloidal silica particle group (c) of $W(a):W(c)=1:0.05$ to 9.0, and contains colloidal silica particles with the $SiO_2$ concentration of 0.5 to 50% by weight.

The second embodiment of the instant invention relates to a polishing composition for an aluminum disk containing silica sol comprising of a colloidal silica particle group having a monomodal numerical particle size distribution with primary particle sizes of 80 to 120 nm as observed on a transmission electron microscope being 90% or more of the total particle number, and having a mean particle size $D_a$ (particle size measured with the nitrogen adsorption method) in the range of 65 to 100 nm (referred as colloidal silica particle group (a) hereinafter), a colloidal silica particle group having a monomodal numerical particle size distribution with primary particle sizes of 20 to 40 nm as observed on a transmission electron microscope being 90% or more of the total particle number, and having a mean particle size $D_c$ (particle size measured with the nitrogen adsorption method) in the range of 15 to 25 nm (referred to as colloidal silica particle group (c) hereinafter), and a colloidal silica particle group having a monomodal numerical particle size distribution with primary particle sizes of 5 to 15 nm as observed on a transmission electron microscope being 90% or more of the total particle number, and having a mean particle size $D_d$ (particle size measured with the nitrogen adsorption method) in the range of 8 to 12 nm (referred as colloidal silica particle group (d) hereinafter), wherein said composition has the ratio of $D_c/D_a$ of 0.15 to 0.38 and the ratio of $D_d/D_c$ of 0.26 to 0.80, contains a water dispersed stable silica sol mixed as $SiO_2$ with the weight ratio of said colloidal silica particle group (a), said colloidal silica particle group (c) and said colloidal particle group (d) being W(a):W(c):W(d)= 1:0.05 to 9.0:0.01 to 1.4, and contains colloidal silica particles with the $SiO_2$ concentration of 0.5 to 50% by weight.

The third embodiment of the instant invention relates to a polishing composition for an aluminum disk containing silica sol comprising of a colloidal silica particle group having a monomodal numerical particle size distribution with primary particle sizes of 40 to 70 nm as observed on a transmission electron microscope being 90% or more of the total particle number, and having a mean particle size $D_b$ (particle size measured with the nitrogen adsorption method) in the range of 35 to 50 nm (referred as colloidal silica particle group (b) hereinafter), and a colloidal silica particle group having a monomodal numerical particle size distribution with primary particle sizes of 20 to 40 nm as observed on a transmission electron microscope being 90% or more of the total particle number, and having a mean particle size $D_c$ (particle size measured with the nitrogen adsorption method) in the range of 15 to 25 nm (referred as colloidal silica particle group (c) hereinafter) or a colloidal silica particle group having a monomodal numerical particle size distribution with primary particle sizes of 5 to 15 nm as observed on a transmission electron microscope being 90% or more of the total particle number, and having a mean particle size $D_d$ (particle size measured with the nitrogen adsorption method) in the range of 8 to 12 nm (referred as colloidal silica particle group (d) hereinafter), wherein said composition has the ratio of $D_c/D_b$ of 0.30 to 0.71 or the ratio of $D_d/D_b$ of 0.16 to 0.34, contains a water dispersed stable silica sol mixed as $SiO_2$ with the weight ratio of said colloidal silica particle group (c) or said colloidal silica particle group (d) and said colloidal particle group (b) being W(b):[W(c) or W(d)]=1:0.05 to 9.0, and contains colloidal silica particles with the $SiO_2$ concentration of 0.5 to 50% by weight.

The polishing compositions according to the first to third embodiments are used in polishing aluminum disks and substrates having silica on the surface thereof.

Here, high speed polishing property is also necessary as one of required properties for polishing compositions in order to obtain disks with small mean waviness. Accordingly, the addition of one or more kinds of aluminum compounds selected from the group consisting of aluminum nitrate, aluminum sulfate, aluminum chloride, basic aluminum nitrate and basic aluminum sulfamate, and one or more kinds of iron compounds selected from the group consisting of iron (III) nitrate, iron (III) chloride, iron (III) sulfate, and iron (III) potassium sulfate [$KFe(SO_4)_2$] as polishing accelerators to the polishing composition of the present invention enables to achieve the high speed polishing.

Aluminum compounds as well as carboxylic acids with the stabilizing effect for trivalent iron compounds such as maleic acid, tartaric acid, citric acid, malic acid, gluconic acid or lactic acid may be added in view of getting accelerating effects in polishing and stabilizing polishing properties.

DETAILED DESCRIPTION OF THE INVENTION

In the present invention, if the ratio of mean particle sizes (particle sizes measured with the nitrogen adsorption method) for colloidal silica particle groups having different monomodal numerical particle size distributions is less than 0.15, the improving effect for the polishing property of the polishing composition is small. Similarly, if the ratio of mean particle size (particle size measured with the nitrogen adsorption method) is greater than 0.80, the improving effect for the polishing property of the polishing composition is also small.

In the present invention, if the smaller colloidal silica particle group among the colloidal silica particle groups having different monomodal numerical particle size distributions has the $SiO_2$ ratio by weight of less than 0.05, the improving effect for the polishing property of the polishing composition is small. Similarly, if it has the $SiO_2$ ratio by weight of more than 9.0, the improving effect for the polishing property of the polishing composition is small as well.

The polishing composition of the present invention may be mixed with colloidal silica particle group having a monomodal numerical particle size distribution with primary particle sizes of more than 150 nm but less than 250 nm as observed on a transmission electron microscope being 90% or more of the total particle number, and having a mean particle size $D_x$ (particle size measured with the nitrogen adsorption method) in the range of 100 to 140 nm.

The content of the colloidal silica particle group in the polishing composition of the present invention is 0.2 to 50% by weight, preferably 1 to 30% by weight as $SiO_2$ concentration. If the $SiO_2$ concentration is less than 0.2% by weight, the effect on the polishing is small, and if the $SiO_2$ concentration is more than 50% by weight, the sol becomes unstable.

Although the silica sol may be used as an alkaline sol as it is in polishing aluminum disks, sols obtained by treating alkaline sols with a cation exchange or sols obtained by rendering acidic with the addition of a water soluble acidic substance such as hydrochloric acid, sulfuric acid, nitric acid, phosphoric acid, acetic acid or oxalic acid are more preferred.

Also, aluminum nitrate, aluminum sulfate, aluminum chloride, basic aluminum nitrate or basic aluminum sulfamate among others as the polishing accelerator may be used and its content is preferably 0.01 to 5.0% by weight as $Al_2O_3$ concentration. If this content is less than 0.01% by weight as $Al_2O_3$ concentration, the effect on the polishing is small, and if it is more than 5.0% by weight, the silica sol becomes unstable.

Iron compound such as iron (III) nitrate, iron (III) chloride, iron (III) sulfate or iron (III) potassium sulfate may be used as the polishing accelerator, and its content is preferably 0.01 to 5.0% by weight as $Fe_2O_3$ concentration. If the content is less than 0.01% by weight as $Fe_2O_3$ concentration, the effect of accelerating on the polishing is small, and if it is more than 5.0% by weight, the silica sol becomes unstable.

Further, the content of carboxylic acid such as maleic acid, tartaric acid, citric acid, malic acid, gluconic acid or lactic acid is preferably 0.01 to 5.0% by weight. If it is less than 0.1% by weight, the effect as polishing accelerator and stabilizing agent is small, and if it is more than 5.0% by weight, the silica sol becomes unstable.

Furthermore, metal salt such as nickel nitrate, zirconyl nitrate, cerium nitrate or ammonium molybdate among others may be added as the polishing accelerator.

The alkaline silica sols may be used as they are, after they are subjected to a cation exchange treatment or rendered acidic with the addition of a water soluble acidic substance such as hydrochloric acid, sulfuric acid, nitric acid, acetic acid or phosphoric acid among others in a method for polishing glass-made hard disks.

Further, alumina, zirconia, zirconium silicate, mullite, cerium oxide, iron oxide, chromium oxide, titanium oxide or tin oxide among others may be added to the polishing composition of the present invention, and hydrated oxides such as aluminum hydroxide, boehmite and goethite as well as non-oxides such as diamond, boron nitride, silicon nitride and silicon carbide may also be added.

Water soluble alcohols such as ethanol, propanol, ethylene glycol and propylene glycol, surface active agents such as sodium alkylbenzenesulfonate and formalin condensate, organic substances of poly-anionic series such as polyacrylic acid salt, and celluloses such as cellulose, hydroxyethyl cellulose and carboxymethyl cellulose, which are generally added to polishing compositions may also be added.

EXAMPLES

In Examples, "as $A_xB_y$ concentration" is expressed as simply "as $A_xB_y$", wherein $A_xB_y$ represents metal oxide, such as $SiO_2$, $Al_2O_3$ or $Fe_2O_3$.

Example 1

Alkaline silica sol (a-1) composed of colloidal silica particle group having a monomodal numerical particle size distribution with primary particle sizes of more than 80 nm but less than 120 nm as observed on a commercially available transmission electron microscope being 90% or more of the total particle number, and having a mean particle size (with the nitrogen adsorption method) of 76 nm (specific gravity: 1.294, viscosity: 2.7 mPa.s, pH at 9.6, $SiO_2$ concentration of 40.5% by weight) was diluted with pure water to the $SiO_2$ concentration of 30.5% by weight and passed through a column packed with cation exchange resin Amberlite-120B to obtain the acidic silica sol (a-2) having the $SiO_2$ concentration of 30.1% by weight. 50 g of the acidic silica sol (c-1) composed of colloidal silica particle group having a monomodal numerical particle size distribution with primary particle sizes of more than 20 nm but less than 40 nm as observed on a commercially available transmission electron microscope being 90% or more of the total particle number and having a mean particle size (with the nitrogen adsorption method) of 21 nm (specific gravity: 1.289, viscosity: 4.1 mPa.s, pH at 2.7, $SiO_2$ concentration of 40.1% by weight), and 20 g of the acidic silica sol (d-1) composed of colloidal silica particle group having a monomodal numerical particle size distribution with primary particle sizes of more than 5 nm but less than 15 nm as observed on a commercially available transmission electron microscope being 90% or more of the total particle number, and having a mean particle size (with the nitrogen adsorption method) of 10 nm (specific gravity: 1.126, viscosity: 1.6 mPa.s, pH at 2.5, $SiO_2$ concentration of 20.4% by weight) were mixed with 265 g of the silica sol (a-2) and the mixture was diluted with pure water to prepare 1,000 g of the polishing composition (α) having the $SiO_2$ concentration of 10.0% by weight. The ratio of mean particle sizes of the colloidal silica particle groups contained in the polishing composition was (c-1)/(a-2)=0.28 and (d-1)/(c-1)=0.48.

Comparative Example 1

The acidic silica sol (a-2) obtained in Example 1 was diluted with pure water to prepare 1,000 g of the polishing composition (α1) having the $SiO_2$ concentration of 10.0% by weight.

Comparative Example 2

The acidic silica sol (c-1) obtained in Example 1 was diluted with pure water to prepare 1,000 g of the polishing composition (α2) having the $SiO_2$ concentration of 10.0% by weight.

Example 2

To an acidic silica sol composed of a mixture consisting of 265 g of the acidic silica sol (a-2) of Example 1, 50 g of the acidic silica sol (c-1) of Example 1 and additionally 20 g of the acidic silica sol (d-2) composed of colloidal silica particle group having a monomodal numerical particle size distribution with primary particle sizes of more than 5 nm but less than 15 nm as observed on a commercially available transmission electron microscope being 90% or more of the total particle number, and having a mean particle size (with the nitrogen adsorption method) of 12 nm (specific gravity: 1.127, viscosity: 1.8 mPa.s, pH at 2.8, $SiO_2$ concentration of 20.4% by weight), 71.4 g of 7.0% by weight aqueous aluminum nitrate solution as $Al_2O_3$ was added, and then the mixture was diluted with pure water to prepare 1,000 g of the polishing composition (β) containing 0.5% by weight of aluminum nitrate as $Al_2O_3$ with the $SiO_2$ concentration of 10.0% by weight, pH at 2.4 and the electroconductivity of 15.5 mS/cm. The ratios of mean particle sizes of the colloidal silica particle groups contained in the polishing composition were (c-1)/(a-2)=0.28 and (d-2)/(c-1)=0.57.

Example 3

To an acidic silica sol composed of a mixture consisting of 388 g of the acidic silica sol (b) composed of a colloidal silica particle group having a monomodal numerical particle size distribution with primary particle sizes of more than 40 nm but less than 70 nm as observed on a commercially available transmission electron microscope being 90% or more of the total particle number, and having a mean particle size (with the nitrogen adsorption method) of 42 nm (specific gravity: 1.128, viscosity: 1.4 mPa.s, pH at 2.3, $SiO_2$ concentration of 20.6% by weight) and 98 g of the acidic silica sol (d-2) of Example 2, 71.4 g of a 7.0% by weight aqueous aluminum nitrate solution as $Al_2O_3$ was added, and the mixture was diluted with pure water to prepare 1,000 g of the polishing composition (γ) containing 0.5% by weight of aluminum nitrate as $Al_2O_3$ with $SiO_2$ concentration of 10.0% by weight, pH at 2.4 and the electroconductivity of 14.3 mS/cm. The ratio of mean particle sizes of the colloidal silica particle groups contained in the polishing composition was (d-2)/(b)=0.29.

Example 4

To an acidic silica sol composed of a mixture consisting of 243 g of the acidic silica sol (b) of Example 3 having a mean particle size of 42 nm and 125 g of the acidic silica sol (c-1) of Example 1, 71.4 g of a 7.0% by weight aqueous aluminum nitrate solution as $Al_2O_3$ was added, and the mixture was diluted with pure water to prepare 1,000 g of the polishing composition (δ) containing 0.5% by weight of aluminum nitrate as $Al_2O_3$ with $SiO_2$ concentration of 10.0% by weight, pH at 2.3 and the electroconductivity of 14.0 mS/cm. The ratio of mean particle sizes of the colloidal silica particle groups contained in the polishing composition was (c-1)/(b)=0.50.

Comparative Example 3

Upon addition of 71.4 g of a 7.0% by weight aqueous aluminum nitrate solution as $Al_2O_3$ to 332 g of the acidic spherical silica sol (a-2) obtained in Example 1, the mixture was diluted with pure water to prepare 1,000 g of the polishing composition (β1) containing 0.5% by weight of aluminum nitrate as $Al_2O_3$ with $SiO_2$ concentration of 10.0% by weight, pH at 2.4 and the electroconductivity of 15.4 mS/cm.

Example 5

To an acidic silica sol composed of a mixture consisting of 265 g of the acidic silica sol (a-2) obtained in Example 1 and 50 g of the acidic spherical silica sol (c-1) of Example 1, 71.4 g of a 7.0% by weight aqueous iron (III) nitrate solution as $Fe_2O_3$ was added, and the mixture was diluted with pure water to prepare 1,000 g of the polishing composition (ε) containing 0.8% by weight of iron (III) nitrate as $Fe_2O_3$ with $SiO_2$ concentration of 10.0% by weight, pH at 1.8 and the electroconductivity of 29.1 mS/cm. The ratio of mean particle sizes of the colloidal silica particle groups contained in the polishing composition was (c-1)/(a-2)= 0.28.

Example 6

To an acidic silica sol composed of a mixture consisting of 66.4 g of the acidic silica sol (a-2) obtained in Example 1 and 200 g of the acidic spherical silica sol (c-1) of Example 1, 71.4 g of a 7.0% by weight aqueous iron (III) nitrate solution as $Fe_2O_3$ was added, and the mixture was diluted with pure water to prepare 1,000 g of the polishing composition (ζ) containing 0.8% by weight of iron (III) nitrate as $Fe_2O_3$ with $SiO_2$ concentration of 10.0% by weight, pH at 1.7 and the electroconductivity of 29.0 mS/cm. The ratio of mean particle sizes of the colloidal silica particle groups contained in the polishing composition was (c-1)/(a-2)= 0.28.

Example 7

To an acidic silica sol composed of a mixture consisting of 265 g of the acidic silica sol (a-2) obtained in Example 1 and 50 g of the acidic spherical silica sol (c-1) of Example 1, 71.4 g of a 7.0% by weight aqueous iron (III) nitrate solution as $Fe_2O_3$ and 5.9 g of 90% lactic acid were added, and then the mixture was diluted with pure water to prepare 1,000 g of the polishing composition (η) containing 0.8% by weight of iron (III) nitrate as $Fe_2O_3$ and 0.5% by weight of lactic acid with $SiO_2$ concentration of 10.0% by weight, pH at 1.4 and the electroconductivity of 35.2 mS/cm. The ratio of mean particle sizes of the colloidal silica particle groups contained in the polishing composition was (c-1)/(a-2)= 0.28.

Comparative Example 4

Upon addition of 71.4 g of a 7.0% by weight aqueous iron nitrate solution as $Fe_2O_3$ to 332 g of the acidic silica sol (a-2) obtained in Example 1, the mixture was diluted with pure water to prepare 1,000 g of the polishing composition (ε1) containing 0.8% by weight of iron (III) nitrate as $Fe_2O_3$ with $SiO_2$ concentration of 10.0% by weight, pH at 1.7 and the electroconductivity of 29.4 mS/cm.

Comparative Example 5

Upon addition of 71.4 g of a 7.0% by weight aqueous iron (III) nitrate solution as $Fe_2O_3$ to 250 g of the acidic silica sol (c-1) of Example 1, the mixture was diluted with pure water to prepare 1,000 g of the polishing composition (ε2) containing 0.8% by weight of iron (III) nitrate as $Fe_2O_3$ with $SiO_2$ concentration of 10.0% by weight, pH at 1.7 and the electroconductivity of 29.0 mS/cm.

Example 8

Upon mixing 58 g of the alkaline silica sol (c-2) (specific gravity: 1.376, viscosity: 19.9 mPa.s, pH at 9.2 and $SiO_2$ concentration of 48.1% by weight) composed of a colloidal silica particle group having a monomodal numerical particle size distribution with primary particle sizes of more than 20 nm but less than 40 nm as observed on a commercially available transmission electron microscope being 90% or more of the total particle number, and having a mean particle size (with the nitrogen adsorption method) of 21 nm with 276 g of the alkaline silica sol (a-1) of Example 1, the mixture was diluted with pure water to prepare 1,000 g of the polishing composition (θ) with $SiO_2$ concentration of 14.0% by weight. The ratio of mean particle sizes of the colloidal silica particle groups contained in the polishing composition was (c-2)/(a-2)=0.28.

Comparative Example 6

The alkaline silica sol (a-1) of Example 1 was diluted with pure water to prepare 1,000 g of the polishing composition (θ1) with $SiO_2$ concentration of 14.0% by weight.

Comparative Example 7

Upon addition of 71.4 g of a 7.0% by weight aqueous aluminum nirate solution as $Al_2O_3$ to 224 g of the acidic silica sol (c-1) of Example 1, the mixture was diluted with pure water to prepare 1,000 g of the polishing composition (β2) containing 0.5% by weight of aluminum nitrate as $Al_2O_3$ with $SiO_2$ concentration of 10.0% by weight, pH at 3.1 and the electroconductivity of 23.0 mS/cm.

Comparative Example 8

Upon addition of 71.4 g of a 7.0% by weight aqueous aluminum nirate solution as $Al_2O_3$ to 490 g of the acidic silica sol (d-2) of Example 2, the mixture was diluted with pure water to prepare 1,000 g of the polishing composition (β3) containing 0.5% by weight of aluminum nitrate as $Al_2O_3$ with $SiO_2$ concentration of 10.0% by weight, pH at 2.8 and the electroconductivity of 22.8 mS/cm.

Comparative Example 9

Upon addition of 71.4 g of a 7.0% by weight aqueous aluminum nirate solution as $Al_2O_3$ to 485 g of the acidic silica sol (b) of Example 3, the mixture was diluted with pure water to prepare 1,000 g of the polishing composition (γ1) containing 0.5% by weight of aluminum nitrate as $Al_2O_3$ with $SiO_2$ concentration of 10.0% by weight, pH at 2.8 and the electroconductivity of 23.2 mS/cm.

Comparative Example 10

The alkaline silica sol (c-2) of Example 8 was diluted with pure water to prepare 1,000 g of the polishing composition (θ2) with $SiO_2$ concentration of 14.0% by weight.

Example 9

Upon mixing 18 g of an alkaline silica sol (d-3) (specific gravity: 1.202, viscosity: 2.3 mPa.s, pH at 9.8 and $SiO_2$ concentration of 30.2% by weight) composed of a colloidal silica particle group having a monomodal numerical particle size distribution with primary particle sizes of more than 5 nm but less than 15 nm as observed on a commercially available transmission electron microscope being 90% or more of the total particle number, and having a mean particle size (with the nitrogen adsorption method) of 12 nm with 267 g of the alkaline silica sol (a-1) of Example 1 and 56 g of the alkaline silica sol (c-2) of Example 8, the mixture was diluted with pure water to prepare 1,000 g of the polishing composition (ι) with $SiO_2$ concentration of 14.0% by weight. The ratio of mean particle sizes of the colloidal silica particle groups contained in the polishing composition was (c-2)/(a-1)=0.28 and (d-3)/(c-2)=0.57.

Comparative Example 11

The alkaline silica sol (d-3) of Example 9 was diluted with pure water to prepare 1,000 g of the polishing composition (ι1) with SiO$_2$ concentration of 14.0% by weight.

Example 10

Upon mixing 278 g of an alkaline silica sol (b-2) (specific gravity: 1.301, viscosity: 3.3 mPa.s, pH at 9.6 and SiO$_2$ concentration of 40.3% by weight) composed of a colloidal silica particle group having a monomodal numerical particle size distribution with primary particle sizes of more than 40 nm but less than 70 nm as observed on a commercially available transmission electron microscope being 90% or more of the total particle number, and having a mean particle size (with the nitrogen adsorption method) of 42 nm with 73 g of the alkaline silica sol (c-2) of Example 8, the mixture was diluted with pure water to prepare 1,000 g of the polishing composition (κ) with SiO$_2$ concentration of 14.0% by weight. The ratio of mean particle sizes of the colloidal silica particle groups contained in the polishing composition was (c-2)/(b-2)=0.50.

Comparative Example 12

The alkaline silica sol (b-2) of Example 10 was diluted with pure water to prepare 1,000 g of the polishing composition (κ1) with SiO$_2$ concentration of 14.0% by weight.

Example 11

Upon mixing 278 g of the alkaline silica sol (b-2) of Example 11 with 93 g of the alkaline silica sol (d-3) of Example 9, the mixture was diluted with pure water to prepare 1,000 g of the polishing composition (λ) with SiO$_2$ concentration of 14.0% by weight. The ratio of mean particle sizes of the colloidal silica particle groups contained in the polishing composition was (d-3)/(b-2)=0.29.

Polishing Test for Aluminum Disks and Glass-made Disks

Polishing tests for polishing compositions (α) to (λ) and polishing compositions (α1) to (κ1) shown in Table 1 and Table 1A were performed as described below.

3.5-inch φ substrates with non-electrolysis Ni—P plating with a thickness of 10 μm (a hard layer of non-electrolysis nickel-phosphorus (Ni—P) plating composed of 90 to 92% of Ni and 8 to 10% of P) over the aluminum substrates were used for the aluminum disks. The substrates had been subjected to primary polishing with the mean surface roughness of 9.3 Å.

3.5-inch φ glass-made substrates composed of 77.9% by weight of SiO$_2$, 17.3% by weight of Al$_2$O$_3$, 2.2% by weight of ZrO$_2$ and 1.6% by weight of ZnO were used for the glass-made hard disks. The substrates had been subjected to primary polishing with the mean surface roughness of 7.3 Å.

A polishing pad made of suede type polyurethane (POLITEX DG (trademark), 18-inch φ produced by Rodel Nitta Co.) was pasted on the surface plate of LAPMASTER LM18S polishing machine (Lapmaster SFT Corp.) so as to face the surface of the substrate to be polished, and the substrate was polished under a load of 0.8 kPa.

The numbers of rotation of surface plate as well as head were 15 rotations per minute and the feed rate of the polishing composition was 15 ml/minute. The processed article was taken out after polishing, washed with pure water and then dried, and the removal rate was calculated from the reduction in weight. The mean surface roughness (Ra) of the polished surface was measured with New View 100 (Zygo Co.). Surface defects such as pits and scratches were observed with a differential interference microscope.

The results of the removal rate, the mean surface roughness (Ra) and the mean waviness (Wa) in polishing tests are shown in Table 2 for the aluminum disks and in Table 3 for the glass-made disks.

The polished surfaces of aluminum disks and glass-made disks showed no surface defect such as pit or scratch in the present polishing tests.

TABLE 1

| Polishing composition | Mean particle size D (nm) of colloidal silica | | | | SiO$_2$ Weight ratio | | | |
|---|---|---|---|---|---|---|---|---|
| | Da | Db | Dc | Dd | W(a) | :W(b) | :W(c) | :W(d) |
| (α) | 76 | — | 21 | 10 | 1 | :— | :0.25 | :0.05 |
| (α1) | 76 | — | — | — | 1 | :— | :— | :— |
| (α2) | — | — | 21 | — | — | :— | :1 | :— |
| (β) | 76 | — | 21 | 10 | 1 | :— | :0.25 | :0.05 |
| (γ) | — | 42 | — | 12 | — | :1 | :— | :0.25 |
| (δ) | — | 42 | 21 | — | — | :1 | :1 | :— |
| (β1) | 76 | — | — | — | 1 | :— | :— | :— |
| (ε) | 76 | — | 21 | — | 1 | :— | :0 25 | :— |
| (ζ) | 76 | — | 21 | — | 1 | :— | :4 | :— |
| (η) | 76 | — | 21 | — | 1 | :— | :0.25 | :— |
| (ε1) | 76 | — | — | — | 1 | :— | :— | :— |
| (ε2) | — | — | 21 | — | — | :— | :1 | :— |
| (θ) | 76 | — | 21 | — | 1 | :— | :0.25 | :— |
| (θ1) | 76 | — | — | — | 1 | :— | :— | :— |

TABLE 1A

| Polishing composition | Mean particle size D (nm) of colloidal silica | | | | SiO$_2$ Weight ratio | | | |
|---|---|---|---|---|---|---|---|---|
| | Da | Db | Dc | Dd | W(a) | :W(b) | :W(c) | :W(d) |
| (β2) | — | — | 21 | — | — | :— | :1 | :— |
| (β3) | — | — | — | 12 | — | :— | :— | :1 |
| (γ1) | — | 42 | — | — | — | :1 | :— | :— |
| (θ2) | — | — | 21 | — | — | :— | :1 | :— |
| (ι) | 76 | — | 21 | 12 | 1 | :— | :0.25 | :0.05 |
| (ι1) | — | — | — | 12 | — | :— | :— | :1 |
| (κ) | — | 42 | 21 | — | — | :1 | :0.25 | :— |
| (κ1) | — | 42 | — | — | — | :1 | :— | :— |
| (λ) | — | 42 | — | 12 | — | :1 | :— | :0.25 |

TABLE 2

| Polishing composition | Polishing accelerator | Removal rate Vp nm/min | Mean surface roughness Ra (Å) | Mean waviness Wa (Å) | Ratio of removal rate to mean waviness Vp/Wa (min$^{-1}$) |
|---|---|---|---|---|---|
| (α) | None | 29 | 2.8 | 2.6 | 112 |
| (α1) | None | 21 | 3.0 | 3.8 | 55 |
| (α2) | None | 18 | 2.8 | 4.0 | 45 |

TABLE 2-continued

| Polishing composition | Polishing accelerator | Removal rate Vp nm/min | Mean surface roughness Ra (Å) | Mean waviness Wa (Å) | Ratio of removal rate to mean waviness Vp/Wa (min$^{-1}$) |
|---|---|---|---|---|---|
| (β) | Aluminum nitrate | 58 | 2.8 | 2.6 | 223 |
| (γ) | Aluminum nitrate | 61 | 3.0 | 2.7 | 226 |
| (δ) | Aluminum nitrate | 56 | 3.0 | 2.7 | 207 |
| (β1) | Aluminum nitrate | 40 | 3.2 | 4.4 | 91 |
| (ε) | Iron nitrate | 222 | 5.0 | 3.0 | 740 |
| (ζ) | Iron (III) nitrate | 157 | 4.8 | 3.0 | 523 |
| (η) | Iron (III) nitrate + lactic acid | 220 | 4.8 | 2.4 | 917 |
| (ε1) | Iron (III) nitrate | 100 | 4.8 | 3.9 | 256 |
| (ε2) | Iron (III) nitrate | 120 | 4.9 | 3.8 | 316 |

TABLE 2A

| Polishing composition | Polishing accelerator | Removal rate Vp nm/min | Mean surface roughness Ra (Å) | Mean waviness Wa (Å) | Ratio of removal rate to mean waviness Vp/Wa (min$^{-1}$) |
|---|---|---|---|---|---|
| (β2) | Aluminum nitrate | 28 | 2.7 | 4.7 | 60 |
| (β3) | Aluminum nitrate | 21 | 2.7 | 4.7 | 45 |
| (γ1) | Aluminum nitrate | 37 | 2.9 | 3.0 | 123 |

TABLE 3

| Polishing composition | Removal rate Vp nm/min | Mean surface roughness Ra (Å) | Mean waviness Wa (Å) | Ratio of removal rate to mean waviness Vp/Wa (min$^{-1}$) |
|---|---|---|---|---|
| (θ) | 175 | 3.8 | 3.0 | 583 |
| (θ1) | 102 | 3.9 | 4.8 | 213 |

TABLE 3A

| Polishing composition | Removal rate Vp nm/min | Mean surface roughness Ra (Å) | Mean waviness Wa (Å) | Ratio of removal rate to mean waviness Vp/Wa (min$^{-1}$) |
|---|---|---|---|---|
| (θ2) | 59 | 3.7 | 2.7 | 219 |
| (ι) | 170 | 3.6 | 3.0 | 567 |
| (ι1) | 25 | 3.4 | 2.6 | 96 |
| (κ) | 230 | 3.7 | 2.9 | 793 |
| (κ1) | 195 | 3.8 | 3.2 | 610 |
| (λ) | 215 | 3.7 | 2.9 | 741 |

In the polishing method for aluminum disks shown in Table 2 and Table 2A, comparison of the polishing composition (α) in which three types of colloidal silica particle groups having different particle size distributions are mixed with the polishing compositions (α1) and (α2) that have a single particle size distribution indicates that the polishing composition (α) shows an increased removal rate, a mean waviness of less than 3 Å and more than twice of an increased ratio of removal rate to mean waviness so that it has excellent polishing property.

Even in the case of the polishing composition containing aluminum nitrate as the polishing accelerator, comparison of the polishing compositions (β), (γ) and (δ) in which two or three types of colloidal silica particle groups having different particle size distributions are mixed with the polishing composition (β1), (β2), (β3) and (γ1) which are composed of a single type of silica sol indicates that the polishing compositions (β), (γ) and (δ) have similar polishing property.

Further, the polishing compositions (ε), (ζ), (η), (ε1) and (ε2) that contain iron (III) nitrate as the polishing accelerator each show the removal rate more than twice that of the polishing composition containing aluminum nitrate as the polishing accelerator. In addition, comparison of the polishing compositions (ε), (ζ) and (η) in which two or three types of colloidal silica particle groups having different particle size distributions with the polishing compositions (ε1) and (ε2) that are composed of only single type of silica sol indicates that the polishing compositions (ε), (ζ) and (η) have a mean waviness of less than 3 Å and more than twice of the increased ratio of removal rate to mean waviness so that they have excellent polishing property. Also, in the case of the polishing composition (η) that contains lactic acid, the mean waviness is improved.

In polishing glass-made hard disks as shown in Table 3 and Table 3A, comparison of the polishing compositions (θ), (ι), (κ) and (λ) in which three types of colloidal silica particle groups having different particle size distributions with the polishing compositions (θ1), (θ2), (ι1) and (κ1) having a single particle size distribution indicates that the polishing composition (θ), (ι), (κ) and (λ) have improved removal rates, a mean waviness of less than 3 Å and more than twice of the increased ratio of removal rate to mean waviness so that the polishing composition (θ), (ι), (κ) or (λ)

has excellent polishing properties. Furthermore, it is excellent for a removal rate of polishing glass-made hard disks that the polishing composition comprising an alkaline silica sol composed of a colloidal silica particle group having a monomodal numerical particle size distribution with primary particle sizes of more than 40 nm but less than 70 nm as observed on a commercially available transmission electron microscope being 90% or more of the total particle number, and having a mean particle size D (with the nitrogen adsorption method) of 35 to 50 nm.

More rigorous requirements for mean waviness are being imposed on aluminum disks and glass-made disks due to an increase in density of memory capacity, which leads to rotation of the disk at a higher speed and requires a decreased gap between the disk and the magnetic head. Recently, disks having a mean waviness of less than 3 Å are being desired.

The polishing composition of the present invention in which two or three types of colloidal silica particle groups having different particle size distributions are mixed enables polishing at a high removal rate, improves mean waviness and gives a polished surface having a mean waviness of less than 3 Å.

Further, the polishing composition of the present invention that contains an aluminum compound and trivalent iron compound as the polishing accelerator improves removal rate and also mean waviness in the polishing of aluminum disks to give a polished surface having a mean waviness of less than 3 Å. Furthermore, the polishing compositions containing carboxylic acids such as maleic acid, tartaric acid, citric acid, malic acid, gluconic acid and lactic acid among others give similar polished surfaces.

As described above, the polishing composition of the present invention satisfies the requirement that the mean waviness must be less than 3 Å, and in addition, it can improve the productivity of polishing step to achieve a reduction in costs because of an increased removal rate.

Furthermore, since the polishing composition of the present invention can efficiently give smooth polished surfaces with high precision, it is also useful for the precision polishing of quartz glass for photomasks, rock crystal, substrates having silica on the surface thereof, such as silicon oxide films on semiconductor devices, and in addition semiconductor wafers of single silicon, wafers of compound semiconductors such as gallium arsenide, gallium phosphide, and indium phosphide, and interconnecting metals such as copper and aluminum for multi level interconnection substrates, nitride films and carbide films for the precision polishing as well as for the final polishing of single crystals of sapphire, lithium tantalate, lithium niobate and the like, GMR magnetic head, and the like.

What is claimed is:

1. A polishing composition containing a silica sol for an aluminum disk, comprising:

a colloidal silica particle group having a monomodal numerical particle size distribution with primary particle sizes of 80 to 120 nm as observed on a transmission electron microscope being 90% or more of the total particle number, and having a mean particle size $D_a$ (particle size measured with the nitrogen adsorption method) in the range of 65 to 100 nm (referred to as colloidal silica particle group (a) hereinafter), a colloidal silica particle group having a monomodal numerical particle size distribution with primary particle sizes of 20 to 40 nm as observed on a transmission electron microscope being 90% or more of the total particle number, and having a mean particle size $D_c$ (particle size measured with the nitrogen adsorption method) in the range of 15 to 25 nm (referred to as colloidal silica particle group (c) hereinafter), and a colloidal silica particle group having a monomodal numerical particle size distribution with primary particle sizes of 5 to 15 nm as observed on a transmission electron microscope being 90% or more of the total particle number, and having a mean particle size $D_d$ (particle size measured with the nitrogen adsorption method) in the range of 8 to 12 nm (referred to as colloidal silica particle group (d) hereinafter), wherein said composition has a $SiO_2$ concentration of 0.5 to 50% by weight, a water dispersed stable silica sol with the weight ratio of said colloidal silica particle group (a), said colloidal silica particle group (c) and said colloidal silica particle group (d) of W(a):W(c):W(d)=1:0.05 to 9.0:0.01 to 1.4, and the ratio of $D_c/D_a$ of 0.15 to 0.38 and the ratio of $D_d/D_c$ of 0.26 to 0.80.

2. A polishing composition for a substrate with silica on the surface, comprising:

a colloidal silica particle group having a monomodal numerical particle size distribution with primary particle sizes of 80 to 120 nm as observed on a transmission electron microscope being 90% or more of the total particle number, and having a mean particle size $D_a$ (particle size measured with the nitrogen adsorption method) in the range of 65 to 100 nm (referred to as colloidal silica particle group (a) hereinafter), a colloidal silica particle group having a monomodal numerical particle size distribution with primary particle sizes of 20 to 40 nm as observed on a transmission electron microscope being 90% or more of the total particle number, and having a mean particle size $D_c$ (particle size measured with the nitrogen adsorption method) in the range of 15 to 25 nm (referred to as colloidal silica particle group (c) hereinafter), and a colloidal silica particle group having a monomodal numerical particle size distribution with primary particle sizes of 5 to 15 nm as observed on a transmission electron microscope being 90% or more of the total particle number, and having a mean particle size $D_d$ (particle size measured with the nitrogen adsorption method) in the range of 8 to 12 nm (referred to as colloidal silica particle group (d) hereinafter), wherein said composition a $SiO_2$ concentration of 0.5 to 50% by weight, a water dispersed stable silica sol with the weight ratio of said colloidal silica particle group (a), said colloidal silica particle group (c) and said colloidal silica particle group (d) of W(a):W(c):W(d)=1:0.05 to 9.0:0.01 to 1.4, and has the ratio of $D_c/D_a$ of 0.15 to 0.38 and the ratio of $D_d/D_c$ of 0.26 to 0.80.

3. The polishing composition for an aluminum disk according to claim 1, further comprising one or more kinds of aluminum compounds with the concentration of 0.01 to 5.0% by weight as $Al_2O_3$ selected from the group consisting of aluminum nitrate, aluminum sulfate, aluminum chloride, basic aluminum nitrate and basic aluminum sulfamate as a polishing accelerator.

4. The polishing composition for an aluminum disk according to claim 1, further comprising one or more kinds of iron compounds with the concentration of 0.01 to 5.0% by weight as $Fe_2O_3$ selected from the group consisting of iron (III) nitrate, iron (III) chloride, iron (III) sulfate, and iron (III) potassium sulfate ($KFe(SO_4)_2$) as a polishing accelerator.

5. The polishing composition for an aluminum disk according to claim 1, further comprising one or more kinds of carboxylic acids with the concentration of 0.01 to 5.9% by weight selected from the group consisting of maleic acid, tartaric acid, citric acid, malic acid, gluconic acid and lactic acid.

6. The polishing composition for an aluminum disk according to claim 1, further comprising one or more kinds of aluminum compounds with the concentration of 0.01 to 5.0% by weight as $Al_2O_3$ selected from the group consisting of aluminum nitrate, aluminum sulfate, aluminum chloride, basic aluminum nitrate and basic aluminum sulfamate as a polishing accelerator, and one or more kinds of carboxylic acids with the concentration of 0.01 to 5.9% by weight selected from the group consisting of maleic acid, tartaric acid, citric acid, malic acid, gluconic acid and lactic acid.

7. The polishing composition for an aluminum disk according to claim 1, further comprising one or more kinds of iron compounds with the concentration of 0.01 to 5.0% by weight as $Fe_2O_3$ selected from the group consisting of iron (III) nitrate, iron (III) chloride, iron (III) sulfate, and iron (III) potassium sulfate ($KFe(SO_4)_2$) as a polishing accelerator, and one or more kinds of carboxylic acids with the concentration of 0.01 to 5.9% by weight selected from the group consisting of maleic acid, tartaric acid, citric acid, malic acid, gluconic acid and lactic acid.

* * * * *